R. H. THOMAS.
Devices for Adjusting the Elevating and Depressing Screws of Rolls.
No. 138,452. Patented April 29, 1873.
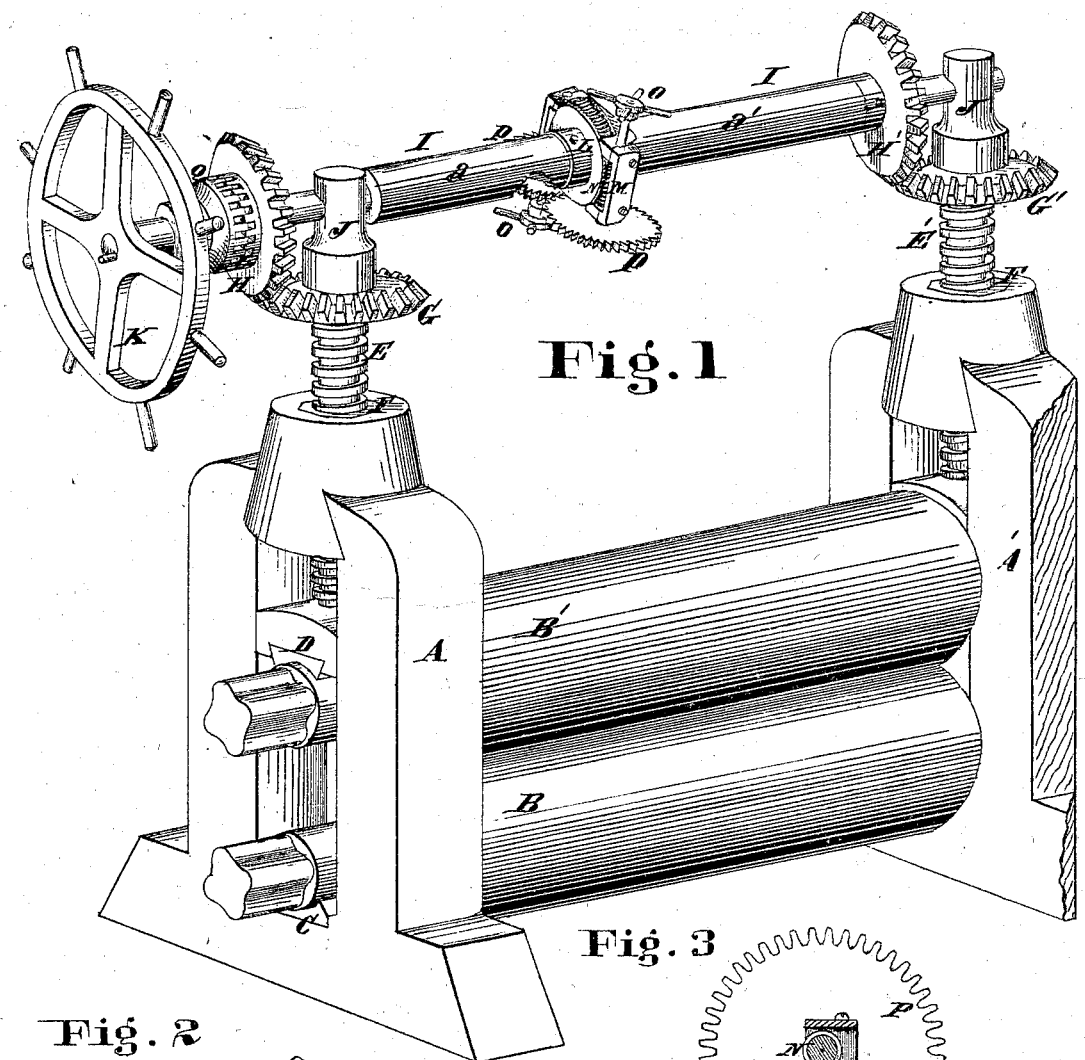
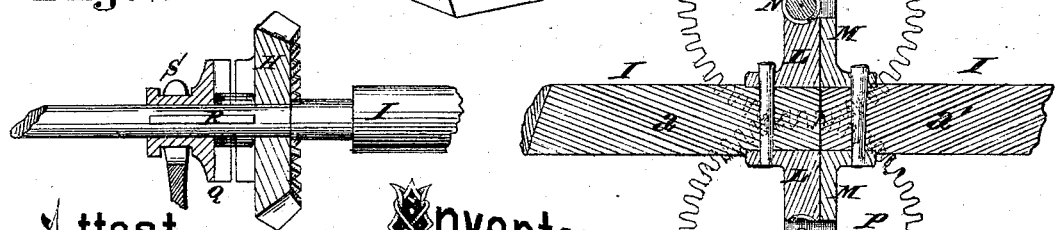

UNITED STATES PATENT OFFICE.

RICHARD H. THOMAS, OF NEWPORT, KENTUCKY.

IMPROVEMENT IN DEVICES FOR ADJUSTING THE ELEVATING AND DEPRESSING SCREWS OF ROLLS.

Specification forming part of Letters Patent No. 138,452, dated April 29, 1873; application filed December 7, 1872.

*To all whom it may concern:*

Be it known that I, RICHARD H. THOMAS, of Newport, Campbell county, State of Kentucky, have invented a certain new and useful Improvement in Devices for Adjusting the Relative Position of the Screws of Rolls, of which the following is a specification:

Nature and Objects of Invention.

My invention consists, in the first part, of a two-part horizontal shaft, connected by bevel-gearing to the adjusting-screws of the rolls, one part of the shaft having a worm-wheel upon it, and the other part a frame, in which a worm is journaled to mesh into a worm-wheel, the object being to enable the operator to adjust the relative position of the two parts of the shaft, in the direction of rotation, for the purpose of defining accurately the relative thickness of the two sides of the plate or bar to be rolled or under the operation of rolling. The second part of my invention consists of an adjustable clutch upon the cross two-part shaft for facilitating the adjustment of the screws of the rolls when they are required to be changed rapidly for a considerable adjustment.

Description of the Accompanying Drawing.

Figure 1 is a perspective view of a pair of rolls embodying my invention. Fig. 2 is a sectional view of the adjustable clutch and part of the cross-shaft. Fig. 3 is a sectional view of the two-part shaft near the middle, showing the junction of the two parts, and the worm-wheel and worm device for connecting the two parts together.

General Description.

A A' are the housings of the rolls, and B B' the pair of rolls, which latter may be of the plain cylindrical character, as shown, or of any approved form adapted to the kind of work to be done. The lower roll is journaled, in the ordinary way, on the bearings C; and the upper roll rests upon it, the latter having a bearing, D, which forms a journal-bearing for the upper roll when the upward pressure is brought to bear upon it in the act of rolling. E E' represent screws, such as are used in the kind of rolls shown, the ends simply pressing upon the top of bearing D, and the screw-threads upon them fitting the nuts F.

By the adjustment of these screws relatively the plate under the operation of rolling is regulated in thickness laterally; and, in order that both may be operated simultaneously for the ordinary raising and lowering of the rolls, and yet admit of nice adjustment relatively, I have devised the following mechanism: The screws are both fitted with bevel-wheels G G', into which the bevel-wheels H H' of a cross-shaft I fit or mesh. The upper part of the screws E E' have union or swiveling connections with the bearings J, the connections being such that the screws can turn independent of the bearings, and the bearings prevented from becoming separated from the screws. By the rotation of the shaft I by means of wheel K the screws are simply operated simultaneously, as heretofore accomplished. The shaft I I divide into two parts, $a a'$. To the part $a$ I firmly attach a worm-wheel, L; and to the part $a'$ I attach a frame, M, in which a worm, N, is journaled, which meshes into the worm-wheel L in the manner shown.

So long as the worm remains stationary the parts $a a'$ are firmly locked together; but, in order to put one part in advance of the other, in the direction of rotation, to adjust the roll B', it is only necessary to revolve the worm by hand, and for this purpose I attach the hand-wheels O, geared together by wheels P, so as to afford facility for turning the worm upon either side of the shaft.

By this simple device the roll B' can be adjusted to give uniform thickness to the rolled plates laterally, or a tapering form, if desired; and is also serviceable in rolls for many other purposes than plate-rolls.

To afford facility for coarse adjustment I attach the wheel H loosely to the shaft; and, in connection with it, I use a clutch, Q, which meshes into it, the clutch being on a feather, R, upon the shaft.

By detaching the clutch from the wheel H the shaft I may be rotated so as to operate the screw E' alone; and when this coarse adjustment of one end has been accomplished the clutch may be reconnected.

The clutch and wheel H may be marked to match, so as to be easily replaced in the primary position.

The clutch is operated by the jaw S of an ordinary clutch-lever.

*Claims.*

1. In combination with the two screws E E', the two-part shaft I, worm-wheel L, and worm N, connected and operating substantially in the manner and for the purpose specified.

2. In combination with the shaft I, screws E E', and wheels G G' H H', the clutch Q, operating substantially as described, and for the purpose specified.

In testimony of which invention I hereunto set my hand.

RICHARD H. THOMAS.

Witnesses:
FRANK MILLWARD,
J. L. WARTMANN.